No. 690,641. Patented Jan. 7, 1902.
I. H. DAVIS.
POWER TRANSMITTING DEVICE.
(Application filed Apr. 24, 1901.)
(No Model.) 2 Sheets—Sheet 1.
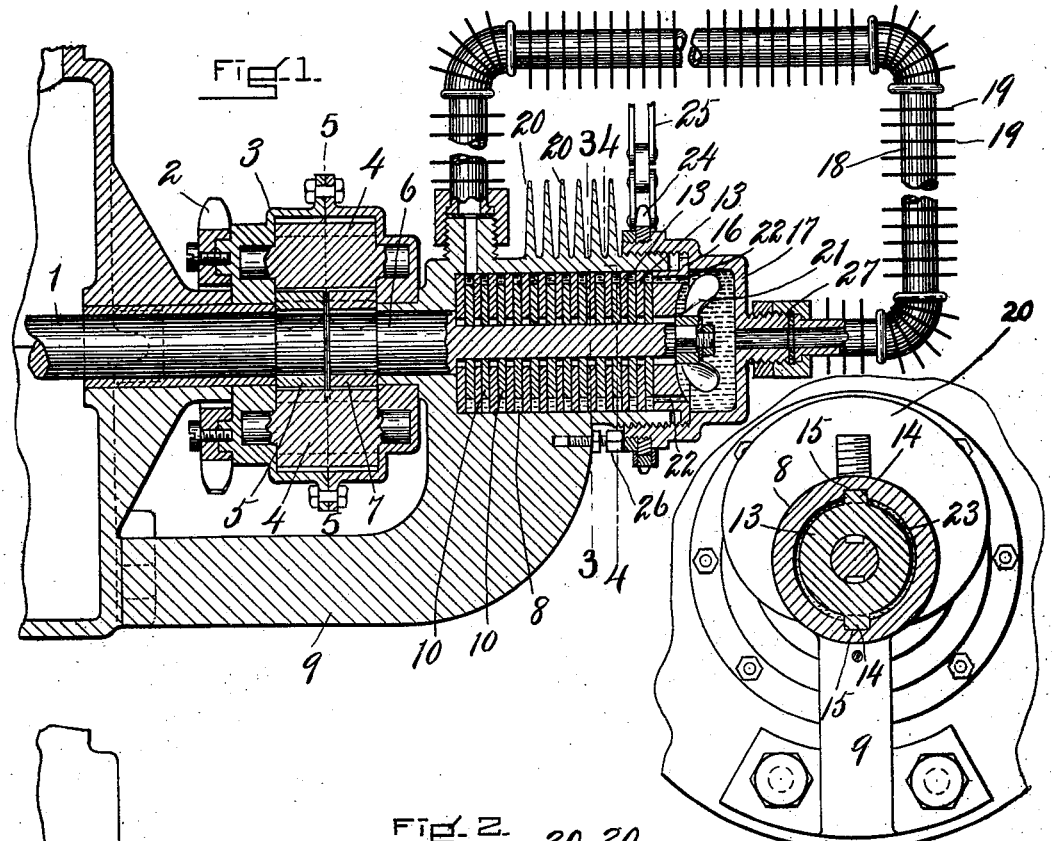
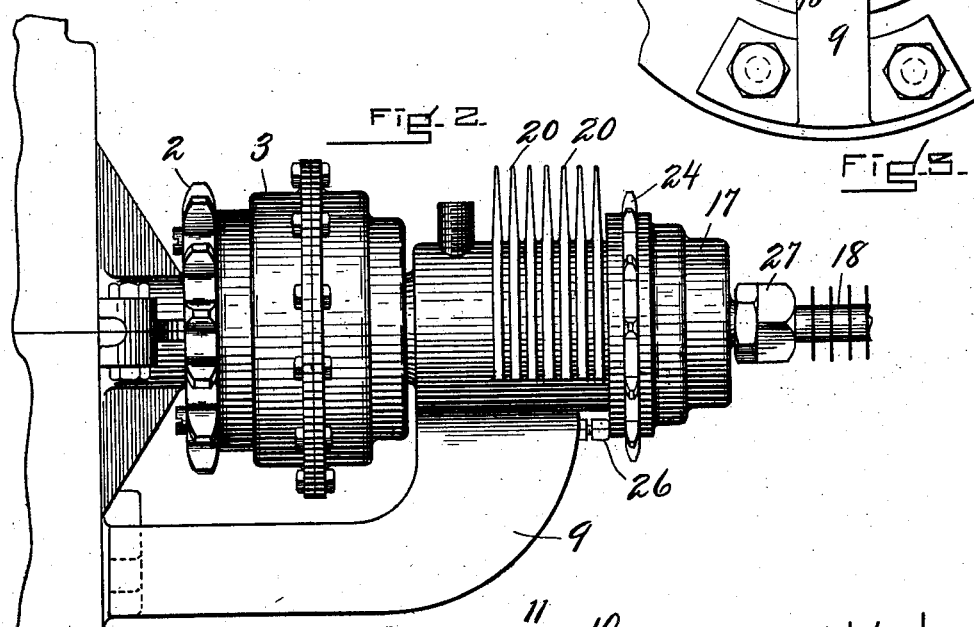
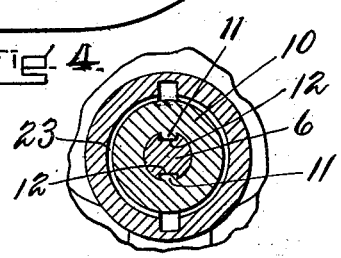
WITNESSES.
E. T. Batchelder
George Pezzetti
INVENTOR.
I. H. Davis
by Wright Brown & Quinby
Attys.
THE NORRIS PETERS CO., PHOTO-LITHO., WASHINGTON, D. C.

No. 690,641. Patented Jan. 7, 1902.
I. H. DAVIS.
POWER TRANSMITTING DEVICE.
(Application filed Apr. 24, 1901.)
(No Model.) 2 Sheets—Sheet 2.
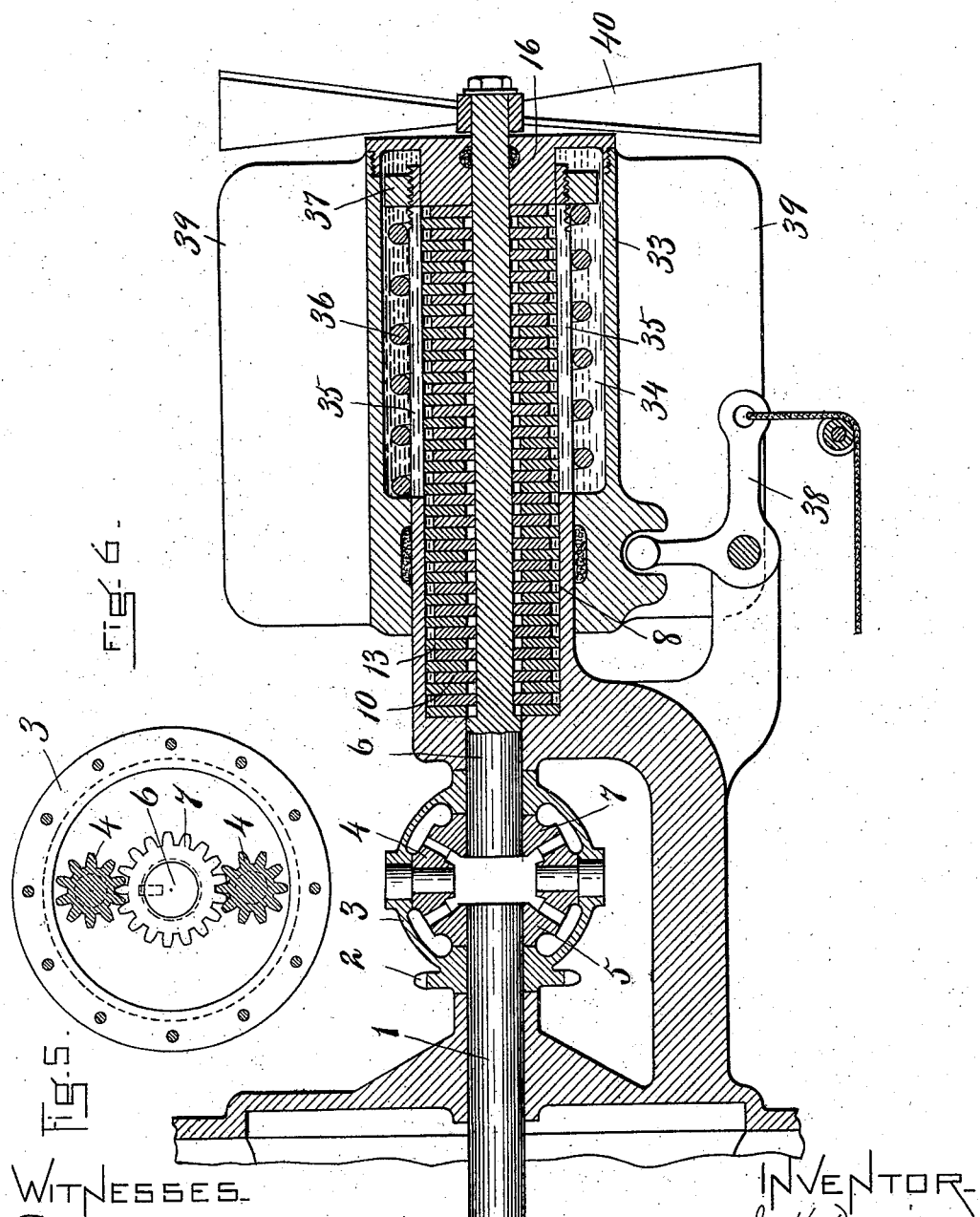

UNITED STATES PATENT OFFICE.

ISAAC H. DAVIS, OF BOSTON, MASSACHUSETTS, ASSIGNOR OF ONE-HALF TO EDWIN D. MELLEN, OF CAMBRIDGE, MASSACHUSETTS.

POWER-TRANSMITTING DEVICE.

SPECIFICATION forming part of Letters Patent No. 690,641, dated January 7, 1902.

Application filed April 24, 1901. Serial No. 57,218. (No model.)

*To all whom it may concern:*

Be it known that I, ISAAC H. DAVIS, of Boston, in the county of Suffolk and State of Massachusetts, have invented certain new and useful Improvements in Power-Transmitting Devices, of which the following is a specification.

This invention relates to mechanism for starting and stopping and changing the speed of a driven member, particularly such members as are driven by explosion-engines and other constantly-operated motors.

The invention consists in novel means for applying a variable braking power to the controlling member of a differential gear.

Of the accompanying drawings, forming a part of this specification, Figure 1 represents an axial section of a power-transmitting device constructed in accordance with my invention. Fig. 2 represents a side elevation thereof. Figs. 3, 4, and 5 represent sections on lines 3 3, 4 4, and 5 5 of Fig. 1. Fig. 6 represents an axial section showing a second modification.

The same reference characters indicate the same parts in all of the figures.

In the drawings, 1 represents the shaft of a constantly-driven motor, and 2 represents a sprocket-wheel driven thereby and adapted to be connected to any suitable mechanism which it is desired to drive, such as the shaft of an automobile vehicle. Sprocket 2 is attached to a frame or casing 3, having bearings for the epicyclic or planetary gear members 4 of a differential train. The shaft 1 has a gear 5 meshing with the planetary gears 4 4, and a controlling-shaft 6, alined with shaft 1, has a similar gear 7 meshing with said planetary gears. The casing 3 is adapted to rotate concentrically about the shafts 1 and 6.

The outer end of shaft 6 enters a chamber 8, formed in an arm or bracket 9, extended from the motor-casing, and is provided in said chamber with numerous parallel friction-disks 10 10, having splines or keys 11 11, fitting in longitudinal keyways 12 12 on the shaft 6. Interposed between the friction-disks 10 10 on shaft 6 are stationary friction-disks 13 13, having keys or splines 14 14 fitting in longitudinal keyways 15 15 in the wall of the chamber 8. The disks 10 and 13 are movable to a limited extent axially of the shaft 6, so as to pack more or less closely together, and the outer end of the stack is engaged by a longitudinally-movable block 16, held from rotation by the keyways 15, said block being engaged on its outer face by a cup-shaped nut 17, having an internal thread engaging an external thread on the bracket 9, said cup-shaped nut forming the outer end wall of the chamber containing the disks. A suitable lubricating liquid, preferably of a non-freezable nature, such as a mixture of glycerin and water, is contained in the chamber 8 and is adapted to circulate through a cooler 18, consisting of a course of pipe connected at its ends to the two ends of the chamber 8 and provided with heat-radiating flanges 19 19. The walls of the chamber 8 are also provided exteriorly with heat-radiating flanges 20 20. A screw-propeller 21 is attached to the end of shaft 6 to circulate the cooling liquid through the cooler and the disk-chamber, and the block 16 is provided with longitudinal apertures 22 22 to permit the passage of the liquid. The peripheries of the friction-disks are preferably separated a slight distance from the walls of the chamber 8 to form an annular passage 23 for the circulation of the liquid in contact with the disks. The nut 17 is provided with a sprocket-wheel 24, engaged by a chain 25 under the control of the attendant or driver, whereby the nut is rotated. The inward axial movement of the nut is limited by a stop-screw 26, which may be adjusted to regulate the maximum pressure between the disks. A stuffed coupling 27 connects the nut 17 with the cooler 18, and longitudinal movement of the nut is allowed for by the resilience or spring of the cooler.

It is apparent that by rotating the nut 17 an adjustable uniformly-graduated braking effect may be exerted on the shaft 6 by the resulting increase or decrease of friction between the rotating and stationary disks 10 13. This friction may be made so slight as to be negligible or it may be so great as to arrest the rotation of the shaft 6. The resistance of the carriage or other driven member being supposed to be considerable, it is apparent that if no appreciable friction or braking action is exerted on the shaft 6 the bearing-case 3 of the planetary gears will remain stationary and the motion of driving-shaft 1 will be communicated in full through said planetary gears to shaft 6. By gradually increasing the friction on shaft 6 until the resistance to its rotation is equal to the resistance to the rotation of the casing 3 the said casing will be started in rotation at a gradually-increasing speed until when said resistances are equal the power of the motor-shaft will be equally distributed between casing 3 and shaft 6. By still further increasing the friction on shaft 6 its rotation will be uniformly arrested and the speed of the casing 3 will be uniformly increased until when the shaft 6 is brought to rest the casing 3 will receive the full power of the motor and will have the greatest speed of which it is capable from the relation of the gears. The liquid in chamber 8 and cooler 18 effects the lubrication of the friction-surfaces of the disks 10 13, which is very important in order to prevent their rapid wearing away and destruction, and it also serves to absorb the heat generated by the friction of said disks, which heat is dissipated into the atmosphere by the heat-radiating surfaces of the chamber and cooler walls.

Fig. 6 represents a modification of my invention, characterized by a chamber 8, containing a quiescent body of lubricating liquid in contact with the friction-disks 10 13, an axially-sliding sleeve 33, mounted on the outside of said chamber and having a chamber 34, also containing the cooling liquid and communicating with the disk-chamber through slots 35, and a spring 36, interposed between the sleeve 33 and an adjusting-nut 37 on the end of the disk-chamber shell. The sleeve 33 carries the block 16, which abuts against the end of the disk-stack, and longitudinal movement is imparted to the sleeve in a direction to increase the frictional pressure between the disks by the spring 36 and in a direction to relieve said pressure by a lever 38 under the control of the operator engaging said sleeve. The walls of the sleeve 33 are provided with longitudinal heat-radiating flanges 39, and the end of shaft 6 passing outside of the sleeve is provided with an air-fan 40 to cool these flanges. By adjusting the nut 37 the maximum pressure between the friction-disks may be varied.

My device is shown as applied directly to the shaft of the motor; but this need not necessarily be so, as various modifications may be made in the arrangement of parts hereinbefore shown without departing from the spirit of my invention.

I claim—

1. In power-transmitting apparatus, the combination of a differential transmitting device, a driving member for said device, a driven member, and a controlling member, and a liquid-immersed friction device for braking the controlling member.

2. In power-transmitting apparatus, the combination of a differential transmitting device, a driving member for said device, a driven member, and a controlling member, a liquid-lubricated friction device for braking the controlling member, and a cooler for the lubricating liquid.

3. In power-transmitting apparatus, the combination of a differential transmitting device, a driving member for said device, a driven member, and a controlling member, a liquid-lubricated friction device for braking the controlling member, a cooler for the lubricating liquid, and means operated by the movement of the controlling member for circulating the lubricating liquid through the cooler.

4. In power-transmitting apparatus, the combination of an epicyclic transmitting device, the driving, driven and controlling members for said device, a friction device to variably brake the controlling member, means to vary the friction thereof, and a body of lubricating liquid immersing said device.

5. In power-transmitting apparatus, the combination of an epicyclic transmitting device, the driving, driven and controlling members for said device, a friction device to variably brake the controlling member, means to vary the friction thereof, a body of lubricating liquid immersing said device, and a cooler for said liquid comprising an elongated pipe-circuit.

6. In power-transmitting apparatus, the combination of an epicyclic transmitting device, the driving, driven and controlling members for said device, a friction device to variably brake the controlling member, means to vary the friction thereof, a body of lubricating liquid immersing said device, a cooler for said liquid comprising an elongated pipe-circuit, and means operated by the movement of said controlling member for circulating the liquid through said cooler.

7. In power-transmitting apparatus, the combination of an epicyclic transmitting device, the driving, driven and controlling members for said device, a shaft connected to the controlling member, a series of friction-disks connected with said shaft so as to rotate therewith, a series of interposed friction-disks held against rotation, means to vary the friction between said disks, and a lubricating liquid immersing said disks.

8. In power-transmitting apparatus, the combination of an epicyclic transmitting device, the driving, driven and controlling members for said device, a shaft connected to the controlling member, a series of friction-disks connected with said shaft so as to rotate therewith, a series of interposed friction-disks held against rotation, said disks being movable axially of the controlling-shaft, means to vary the axial pressure between said disks, and a stop to limit the maximum pressure.

9. In power-transmitting apparatus, the combination of an epicyclic transmitting device, the driving, driven and controlling members for said device, a shaft connected to the controlling member, a series of friction-disks connected with said shaft so as to rotate therewith, a series of interposed friction-disks held against rotation, a rotary nut adapted to vary the axial pressure between said disks, and an adjustable stop to limit the pressure-increasing movement of said nut.

In testimony whereof I have affixed my signature in presence of two witnesses.

ISAAC H. DAVIS.

Witnesses:
R. M. PIERSON,
H. L. ROBBINS.